United States Patent
Mohammed et al.

(10) Patent No.: US 11,834,993 B1
(45) Date of Patent: Dec. 5, 2023

(54) ENGINE EXHAUST REVERSE FLOW PREVENTION

(71) Applicant: PRATT & WHITNEY CANADA CORP., Longueuil (CA)

(72) Inventors: Kashif Mohammed, Brossard (CA); Sylvain Lamarre, Boucherville (CA); John Sgouromitis, Dorval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/191,911

(22) Filed: Mar. 29, 2023

(51) Int. Cl.
*F02C 7/14* (2006.01)

(52) U.S. Cl.
CPC .......... *F02C 7/14* (2013.01); *F05D 2220/323* (2013.01); *F05D 2260/213* (2013.01); *F05D 2270/303* (2013.01); *F05D 2300/50212* (2013.01)

(58) Field of Classification Search
CPC ................. F02C 7/14; F05D 2220/323; F05D 2260/213; F05D 2270/303; F05D 2300/50212; F03G 7/0614
See application file for complete search history.

(56) References Cited

U.S. PATENT DOCUMENTS

| | | | |
|---|---|---|---|
| 4,203,566 A | 5/1980 | Lord | |
| 7,040,576 B2 | 5/2006 | Noiseux et al. | |
| 8,434,692 B2 * | 5/2013 | Scott | F01D 9/02 165/96 |
| 8,833,053 B2 * | 9/2014 | Chir | F02K 1/763 60/785 |
| 9,267,390 B2 * | 2/2016 | Lo | F02C 6/08 |
| 9,903,274 B2 * | 2/2018 | Diaz | F02K 3/06 |
| 10,563,936 B2 * | 2/2020 | Tajiri | F01D 25/12 |
| 10,590,799 B2 * | 3/2020 | Zebian | F01D 17/085 |
| 10,739,086 B2 * | 8/2020 | Aouizerate | F28F 27/00 |
| 11,060,462 B2 | 7/2021 | Fert et al. | |
| 2009/0175718 A1 * | 7/2009 | Diaz | F01D 25/12 415/180 |
| 2011/0030337 A1 * | 2/2011 | Mons | F01D 25/12 165/56 |
| 2012/0168115 A1 * | 7/2012 | Raimarckers | F01D 25/08 165/41 |
| 2014/0145008 A1 * | 5/2014 | Webster | F02K 1/50 239/265.19 |

* cited by examiner

*Primary Examiner* — Jesse S Bogue
(74) *Attorney, Agent, or Firm* — NORTON ROSE FULBRIGHT CANADA LLP (57) ABSTRACT

An aircraft engine includes a core gas path through which a core gas flow flows, an exhaust duct receiving the core gas flow, an air-cooled heat exchanger disposed in a heat exchanger duct having an air inlet providing cooling air to the air-cooled heat exchanger and an air outlet in fluid communication with the exhaust duct, and a cover disposed in the heat exchanger duct downstream of the air-cooled heat exchanger. The cover is movable between an open position, in which the cover allows the cooling air to flow through the air outlet into the exhaust duct, and a closed position, in which the cover substantially blocks the air outlet. The cover is operable to move from the open position to the closed position at a predetermined temperature of the cover.

20 Claims, 11 Drawing Sheets

ENGINE EXHAUST REVERSE FLOW PREVENTION

TECHNICAL FIELD

The disclosure relates generally to aircraft engines, and, more particularly, to exhaust flow management in aircraft engines.

BACKGROUND

In some aircraft engines, a duct for a component, such as an air-cooled heat exchanger, has an outlet fluidly coupled to the engine's exhaust duct. As such, the core gas path flowing through the exhaust duct can draw ambient air through the component. When the engine shuts down and the airflow through the main engine gas path stops, remaining hot exhaust gas in the exhaust duct may vent outwards through the duct. If the component includes temperature-sensitive materials such as aluminum, it may be susceptible to temperature-related damage due to the hot exhaust gas flowing therethrough. Improvements are therefore desired.

SUMMARY

In one aspect, there is provided an aircraft engine, comprising: a core gas path through which a core gas flow flows; an exhaust duct receiving the core gas flow; an air-cooled heat exchanger disposed in a heat exchanger duct having an air inlet providing cooling air to the air-cooled heat exchanger and an air outlet in fluid communication with the exhaust duct; and a cover disposed in the heat exchanger duct downstream of the air-cooled heat exchanger, the cover movable between an open position, in which the cover allows the cooling air to flow through the air outlet into the exhaust duct, and a closed position, in which the cover substantially blocks the air outlet, wherein the cover is operable to move from the open position to the closed position at a predetermined temperature of the cover.

In another aspect, there is provided a cover for selectively allowing a flow of gas through a heat exchanger duct upstream of an exhaust duct in an aircraft engine relative to a direction of the flow of gas through the heat exchanger duct, the heat exchanger duct including an air-cooled heat exchanger disposed therein comprising: a plurality of supports extending across the heat exchanger duct downstream of the air-cooled heat exchanger relative to the direction of the flow of gas through the heat exchanger duct; and a plurality of bimetal plates mounted to the supports, the bimetal plates displaceable between a first configuration, below a predetermined temperature of the cover, in which the bimetal plates allow the flow of gas through the heat exchanger duct and a second configuration, above the predetermined temperature of the cover, in which the bimetal plates hinder the flow of gas through the heat exchanger duct.

In a further aspect, there is provided a method of operating an aircraft engine, comprising: in a first operating mode in which the aircraft engine is operating, allowing air to flow through an air-cooled heat exchanger towards an exhaust duct of the aircraft engine via a cover disposed between the air-cooled heat exchanger and the exhaust duct being in an open position; and in a second operating mode in which the aircraft engine is shut down, preventing exhaust gas from flowing from the exhaust duct towards the air-cooled heat exchanger via the cover being in a closed position; wherein the cover is movable between the open position and the closed position at a predetermined temperature of the cover indicative of an alteration between the first operating mode and the second operating mode.

BRIEF DESCRIPTION OF THE DRAWINGS

Reference is now made to the accompanying figures in which.

DETAILED DESCRIPTION

Figure 1:
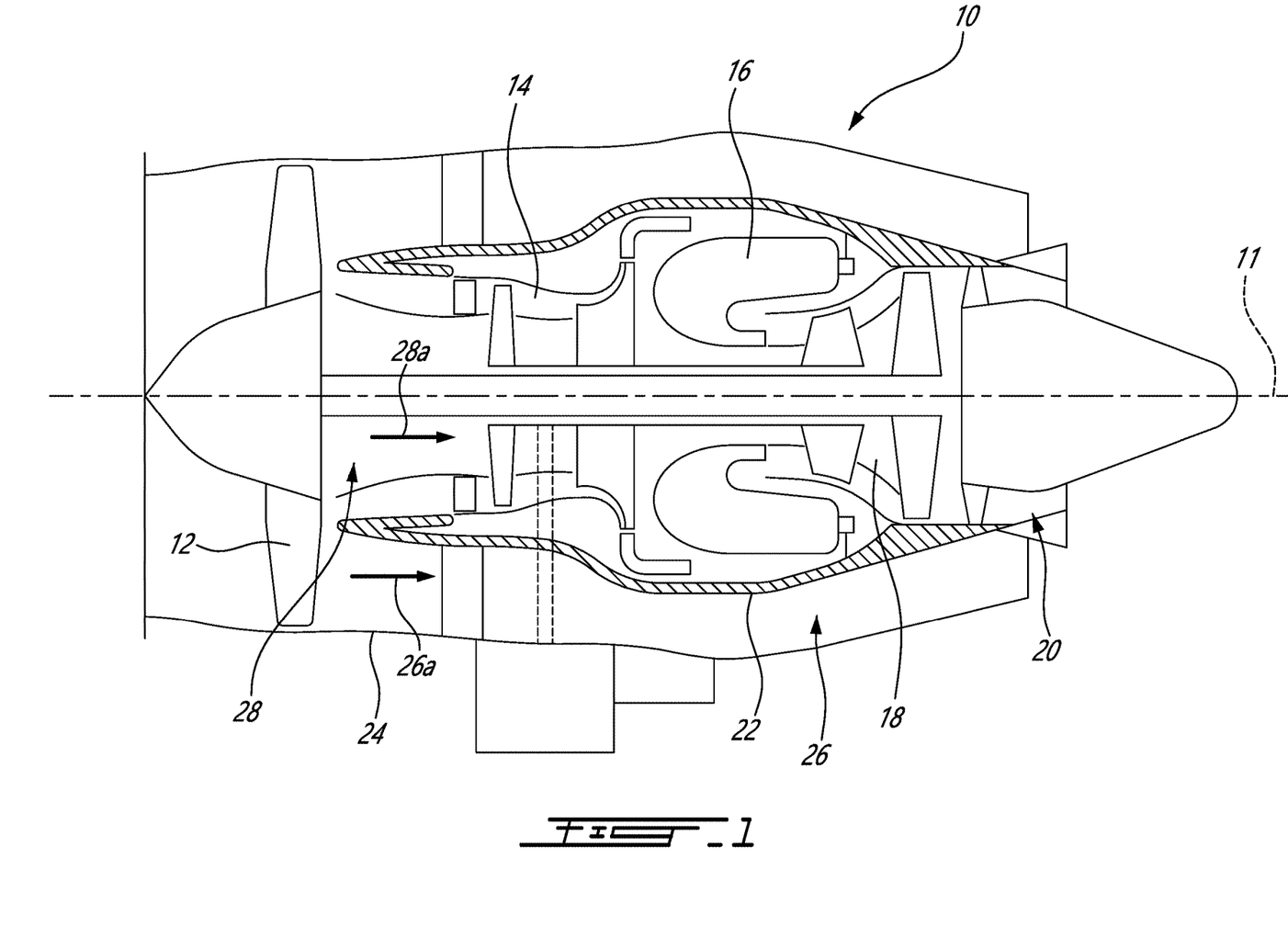
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 further includes an exhaust section 20 where hot combustion gases are expelled. While FIG. 1 depicts engine 10 as a turbofan-type gas turbine engine, the present disclosure may relate to other types of aircraft engines, such as turboprop engines, turboshaft engines, as well as hybrid-electric engines.

The gas turbine engine 10 includes a first, inner casing 22 which encloses the turbo machinery of the engine, and a second, outer casing 24 extending outwardly of the first casing 22 such as to define an annular bypass passage 26 therebetween, also referred to as a bypass duct or an annular outer passage. The air propelled by the fan 12 is split into a first portion which flows around the first casing 22 within the bypass passage 26, and a second portion which flows through a main gas path 28, also referred to as a core passage, which is defined within the first casing 22 and allows the gas flow to circulate through the multistage compressor 14, combustor 16 and turbine section 18 as described above. A core gas flow 28a is said to flow through the main gas path 28 (also referred to as the core gas path), while a bypass gas flow 26a is said to flow through the bypass passage 26.

Figure 2A:
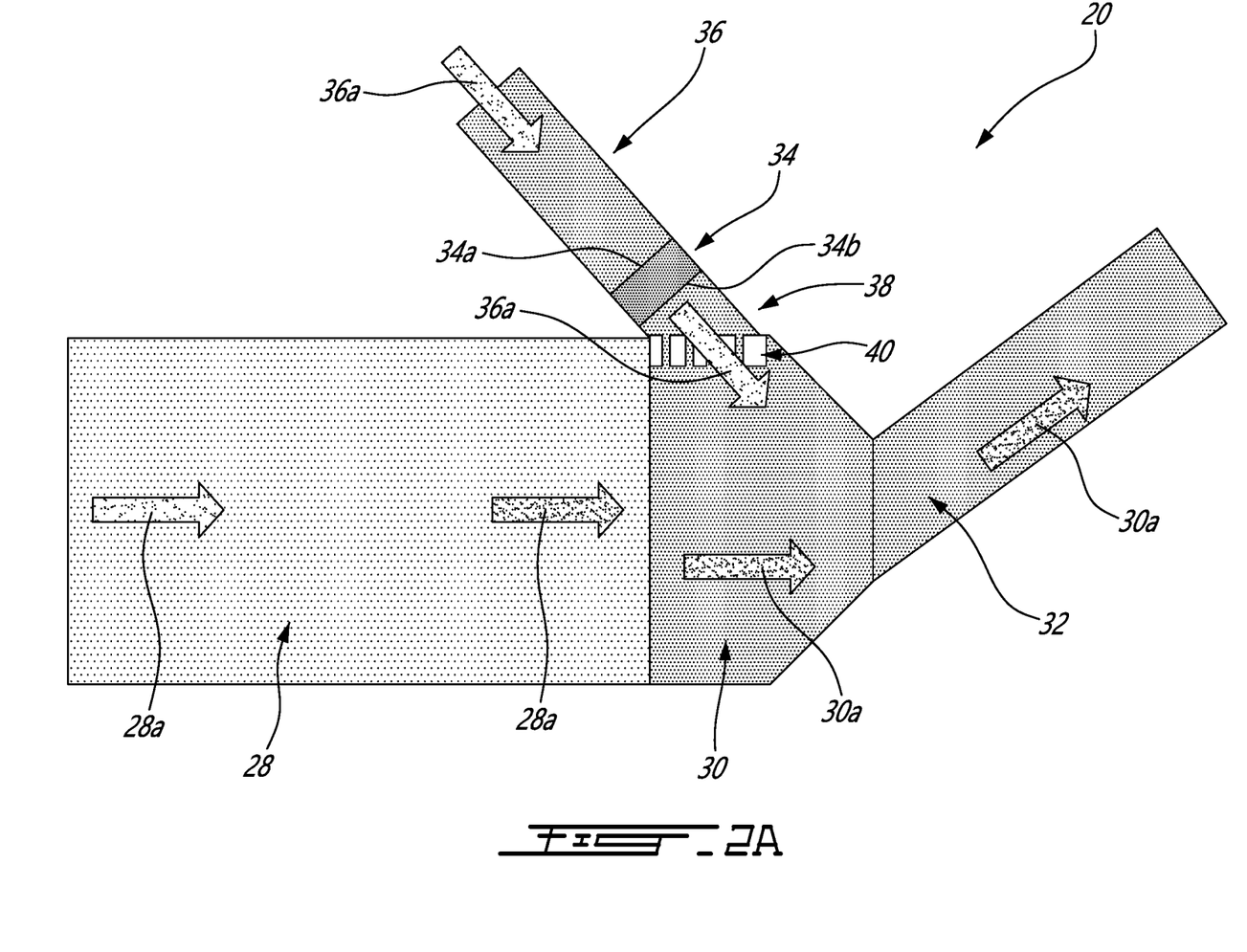
FIG. 2A is a schematic cross sectional view of an exhaust section of the engine of FIG. 1 in a first engine operational mode.
Figure 2B:
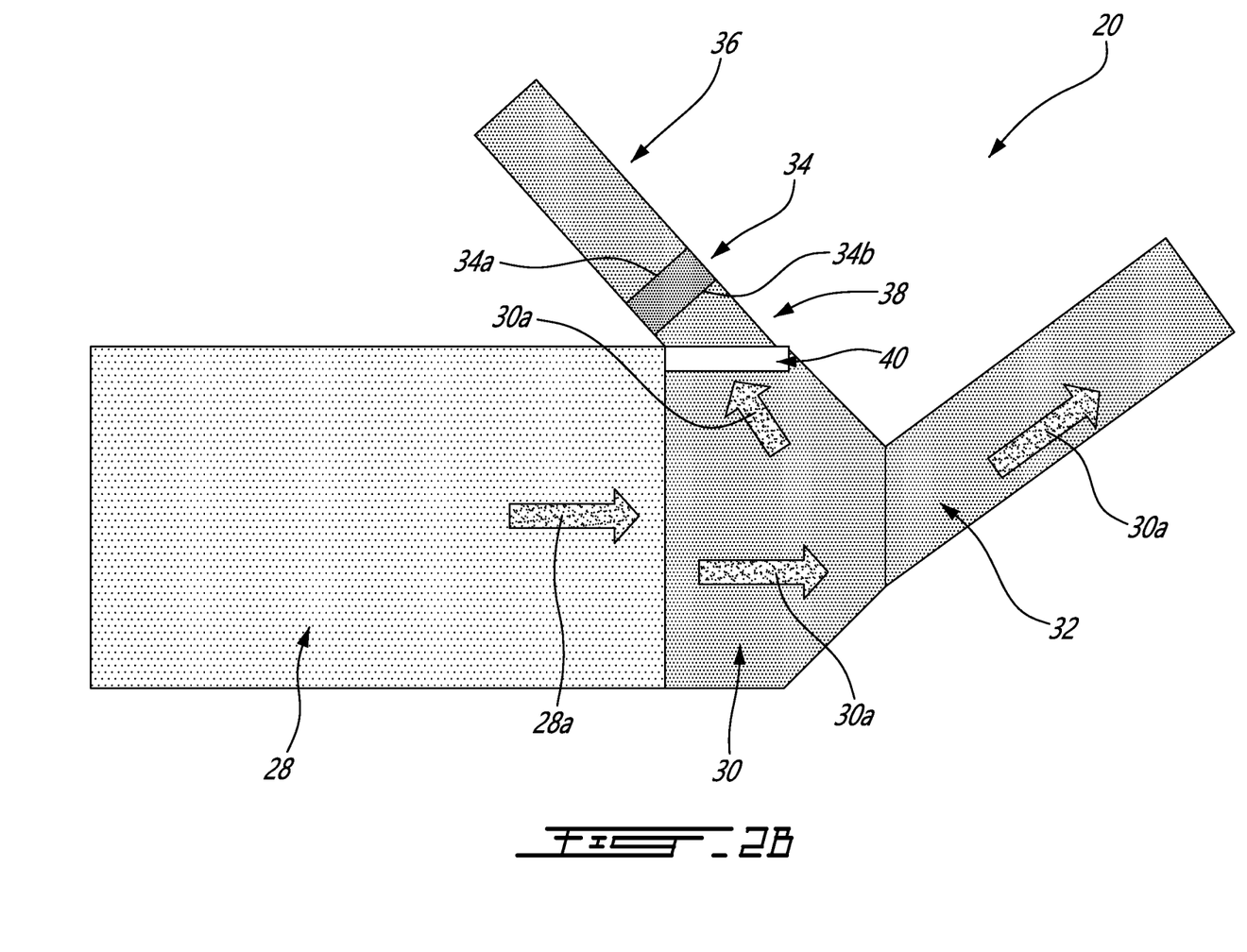
FIG. 2B is a schematic cross sectional view of an exhaust section of the engine of FIG. 1 in a second engine operational mode.

Referring additionally to FIGS. 2A-2B, at the exhaust section 20, the core gas flow 28a and the bypass gas flow 26a are exhausted from the engine 10 through an exhaust duct 30 and an external exhaust 32. In the depicted embodiment, engine 10 further includes a temperature-sensitive component, such as an air-cooled heat exchanger 34, disposed adjacent the exhaust duct 30 and in fluid communication therewith. In an embodiment, the air-cooled heat exchanger 34 is an air-cooler oil cooler, in which warm engine oil is operable to transfer heat to the cool air flowing therethrough. Other types of air-cooled heat exchangers may be contemplated. In particular, the air-cooled heat exchanger 34 receives cooling airflow 36a via an air inlet duct 36, and exhausts the cooling airflow 36a into the exhaust duct 30 via an air outlet duct 38. The air-cooled heat exchanger 34 includes an inlet 34a receiving the cooling airflow 36a from the inlet duct 36 and an outlet 34b for expelling the cooling airflow 36b through the outlet duct 38 towards the exhaust duct 30. The inlet duct 36 and outlet duct 38 may collectively be referred to as a heat exchanger duct. The cross-sectional shape of the heat exchanger duct may vary, for instance circular, square or rectangular.

In the embodiment shown in FIGS. 2A-2B, a cover 40 is disposed in the outlet duct 38 downstream of the air-cooled heat exchanger 34, in particular downstream of the outlet 34b of the air-cooled heat exchanger 34. Also referred to as a baffle, the cover 40 is movable or displaceable between an open position (shown in FIG. 2A), in which the cover 40 selectively allows air from the air-cooled exchanger 34 to flow through the outlet duct 38 and into the exhaust duct 30, and a closed position (shown in FIG. 2B), in which the cover 40 substantially blocks the air outlet 38. As will be discussed in further detail below, the cover 40 is movable between the open and closed positions or configurations based on a temperature of the cover 40. Stated differently, the cover 40 in its open position may be operable to move into its closed position once a predetermined temperature of the cover 40 has been reached or exceeded. Similarly, the cover 40 in its closed position may be operable to move into its open configuration once a temperature of the cover 40 drops to or below the predetermined temperature. The cover 40 may therefore be referred to as a passive cover 40, as its operation (i.e., its movement between positions) is based on the surrounding temperature. As will be discussed in further detail below, the temperature of the cover 40 may correspond to an operational state, or operating condition, of the engine 10, and more particularly to the presence or absence of a cooling airflow 36a flowing through the air-cooled heat exchanger 34 towards the exhaust duct 30. Advantageously, the closed position of the cover 40 may prevent hot gasses (i.e., exhaust flow 30a) from flowing upstream into the outlet duct 38 and through the air-cooled heat exchanger 34 (also referred to as a soak-back condition), which may be susceptible to temperature-related damage such as melting or burning.

FIG. 2A illustratively depicts the engine 10 in an operational or running state or condition. Stated differently, the core gas flow 28a flows through the main gas path 28, i.e., through the compressor section 14, combustor 16 and turbine section 18 towards the exhaust section 20 for evacuation from the engine 10, illustratively via external exhaust 32. As the core gas flow 28a passes through the exhaust duct 30, an eductor effect may occur, whereby a cooling airflow 36a is drawn from a cooling airflow source (not shown), through the inlet duct 36 and through the air-cooled heat exchanger 34 before entering the exhaust duct 30 via the outlet duct 38. The cooling airflow source may be, for instance, the bypass gas flow 26a in the bypass passage 26, or ambient air surrounding the engine 10. In some cases, in addition to or instead of flowing via an eductor effect, the cooling airflow 36a may be forcibly driven through the air-cooled heat exchanger 34 towards the exhaust duct 30. The cooling airflow 36a exiting the air-cooled heat exchanger 34 may be at a temperature below the predetermined temperature at which the cover 40 is operable to move from its open to its closed position. As such, while the engine 10 is in its operational state and the cooling airflow 36a is flowing through the inlet duct 36, the air-cooled heat exchanger 34 and the outlet duct 38 towards the exhaust duct 30, the cover 40 may be maintained at a temperature below the predetermined temperature, and may thus remain in its open position.

FIG. 2B illustratively depicts the engine 10 in a non-operational or non-running state or condition, for instance after an engine shutdown procedure or condition. Stated differently, the core gas flow 28a is no longer actively flowing through the main gas path 28. Remaining or lingering core gas flow 28a, and exhaust flow 30a, may remain to be evacuated. As the core gas flow 28a and exhaust flow 30a are no longer actively flowing, there may no longer be a strong enough flow to create an eductor effect for drawing the cooling airflow 36a through the air-cooled heat exchanger 34. In addition, in the depicted embodiment, the outlet duct 38 is disposed above, i.e., in an upward direction from, the exhaust duct 30 relative to the longitudinal axis 11. As such, the hot exhaust flow 30a may attempt to evacuate from the exhaust duct 30 upwardly via the outlet duct 38 instead of or in addition to via the external exhaust 32. In other cases, the outlet duct 38 may be disposed adjacent or alongside the exhaust duct 30 relative to the longitudinal axis 11. In such a configuration, the adjacent outlet duct 38 may still provide a possible passageway for the hot exhaust flow 30a to evacuate from the exhaust duct 30. In some embodiments, the air-cooled heat exchanger 34 may be a temperature-sensitive component, i.e., it includes one or more materials (e.g., aluminum) that are susceptible to damage (e.g., burning or melting) when exposed to excess heat. As such, the predetermined temperature at which the cover 40 is movable from its open position to its closed position may be set to a temperature below a temperature at which one or more components of the air-cooled heat exchanger 34 may be susceptible to damage. For instance, the predetermined temperature may be selected to be, at most, below a lowest melting point of materials forming the air-cooled heat exchanger 34. Therefore, when the engine 10 is non-operational, the temperature of the cover 40 will increase as it is only exposed to the hot exhaust flow 30a (and not the cooling airflow 36a) until it reaches the predetermined temperature, at which point the cover 40 will transition to its closed position to prevent the hot exhaust flow 30a from traveling upstream through the outlet duct 38 towards the air-cooled heat exchanger. Various magnitudes for the predetermined temperature may be contemplated, as will be discussed in further detail below.

In an exemplary embodiment, the core gas flow 28a exiting the main gas path 28 and the exhaust flow may be at temperatures of around 1000 degrees Fahrenheit. If such gases were to flow upstream into the outlet duct 38, they may melt, burn or otherwise damage one or more components of the air-cooled heat exchanger 34. In addition, the various tubes and fittings joining the air-cooled heat exchanger 34 to the heat exchanger duct may be susceptible to high temperature-related damage. The predetermined temperature at which the cover 40 is movable from its open position to its closed position may therefore be set to a temperature below which damage may be caused to the components of the air-cooled heat exchanger 34. For instance, the predetermined temperature may be selected to be approximately 300 degrees Fahrenheit. Other temperatures for the predetermined temperature may be contemplated.

Referring to FIGS. 3A-4B, a cover 40 according to an embodiment of the present disclosure is shown. The cover 40 is illustratively disposed in the outlet duct 38 downstream of the air-cooled heat exchanger 34 and upstream of the exhaust duct 30 (see FIGS. 2A-2B). The location of the cover 40 within the outlet duct 38 vary. For instance, in the embodiment shown in FIGS. 2A-2B, the cover 40 is disposed at the downstream end of the outlet duct 38, i.e., where the outlet duct 38 meets the exhaust duct 30. Alternatively, in the embodiment shown in FIGS. 3A-3B, the cover 40 is disposed further upstream in the outlet duct 38, i.e., closer to the air-cooled heat exchanger 34. Other locations between the air-cooled heat exchanger 34 and the exhaust duct 30 may be contemplated as well.

Figure 3A:
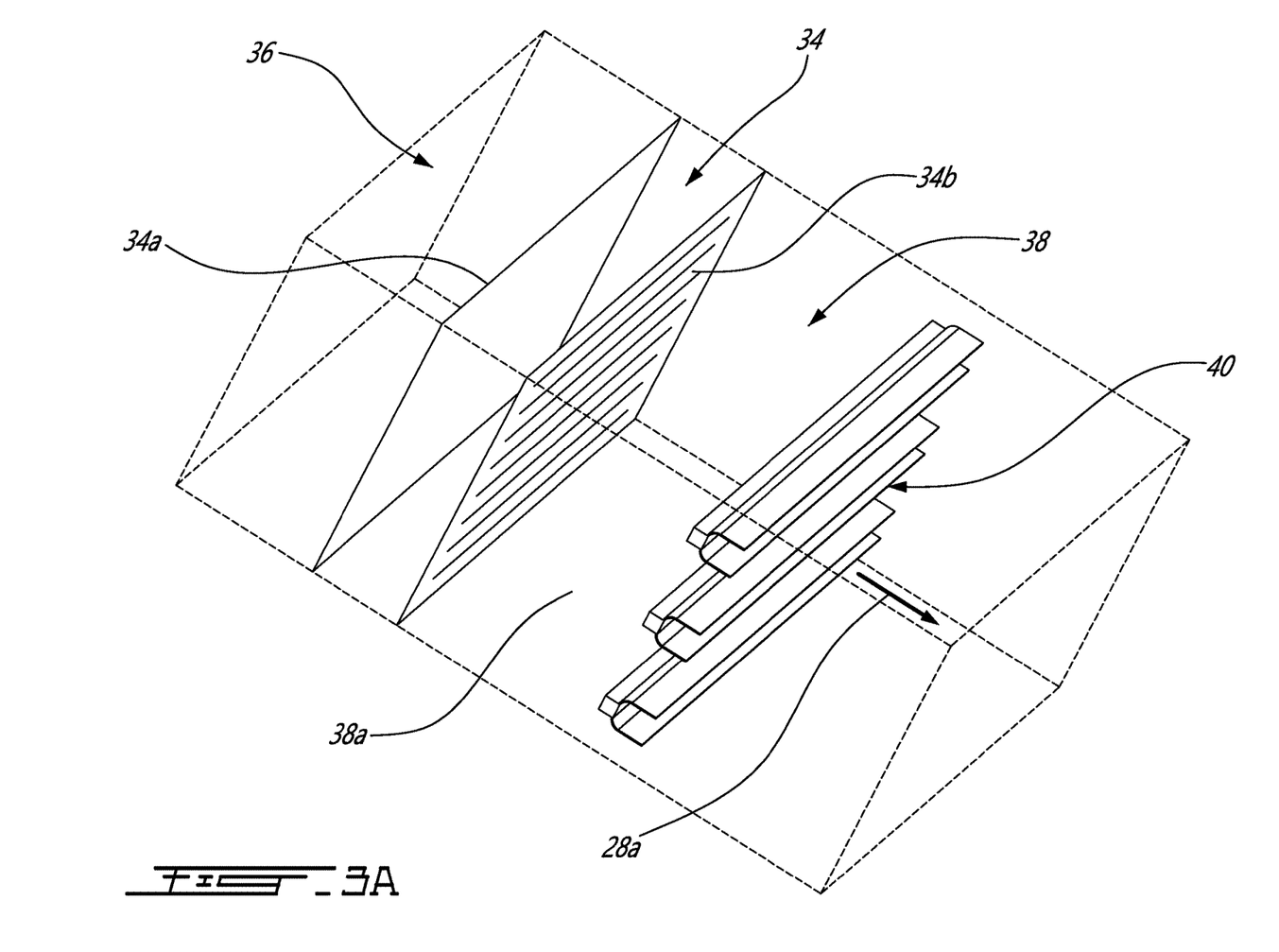
FIG. 3A is a perspective view of a heat exchanger duct for the exhaust section of FIGS. 2A-2B in the first engine operational mode.
Figure 3B:
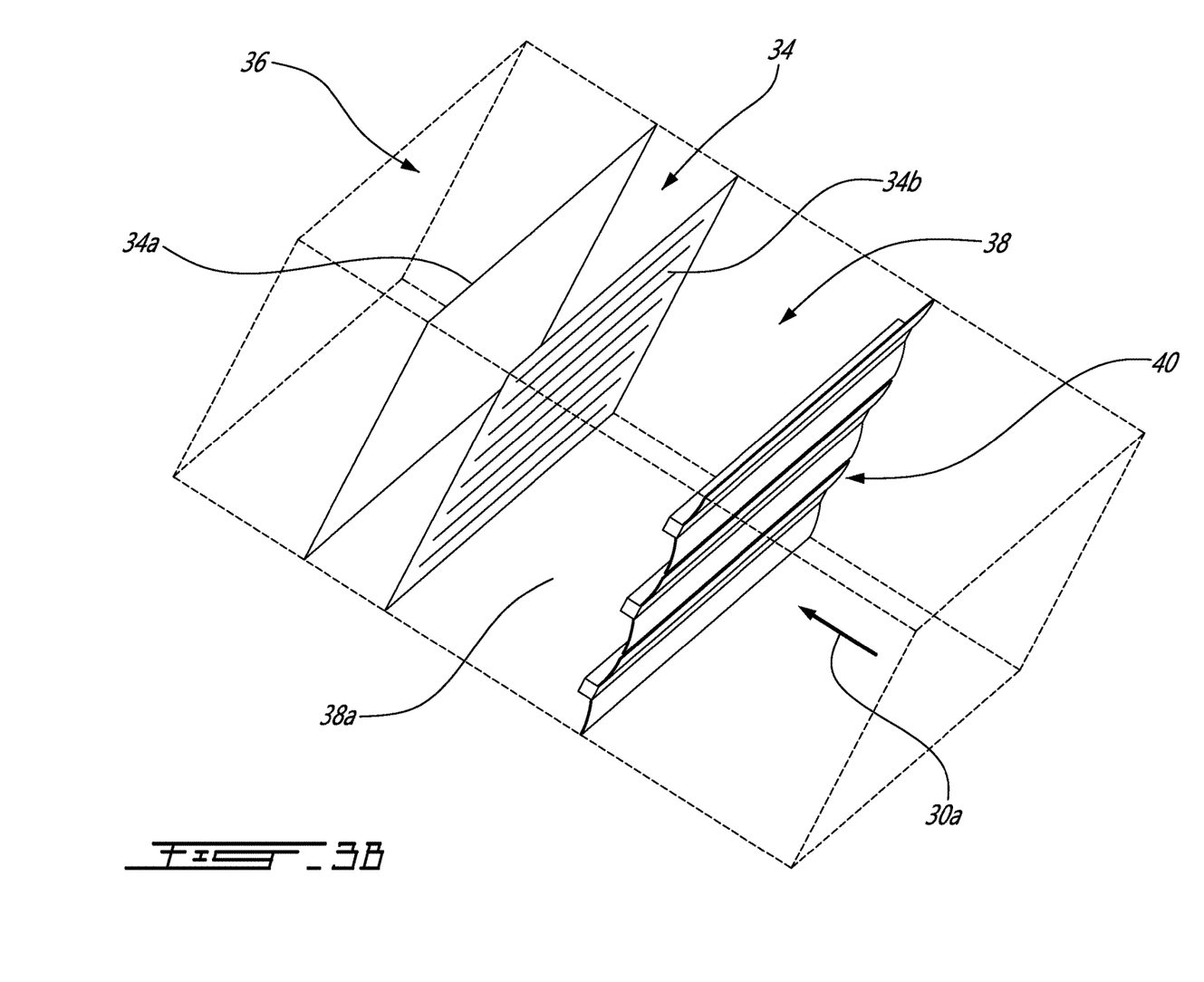
FIG. 3B is a perspective view of a heat exchanger duct for the exhaust section of FIGS. 2A-2B in the second engine operational mode.
Figure 4A:
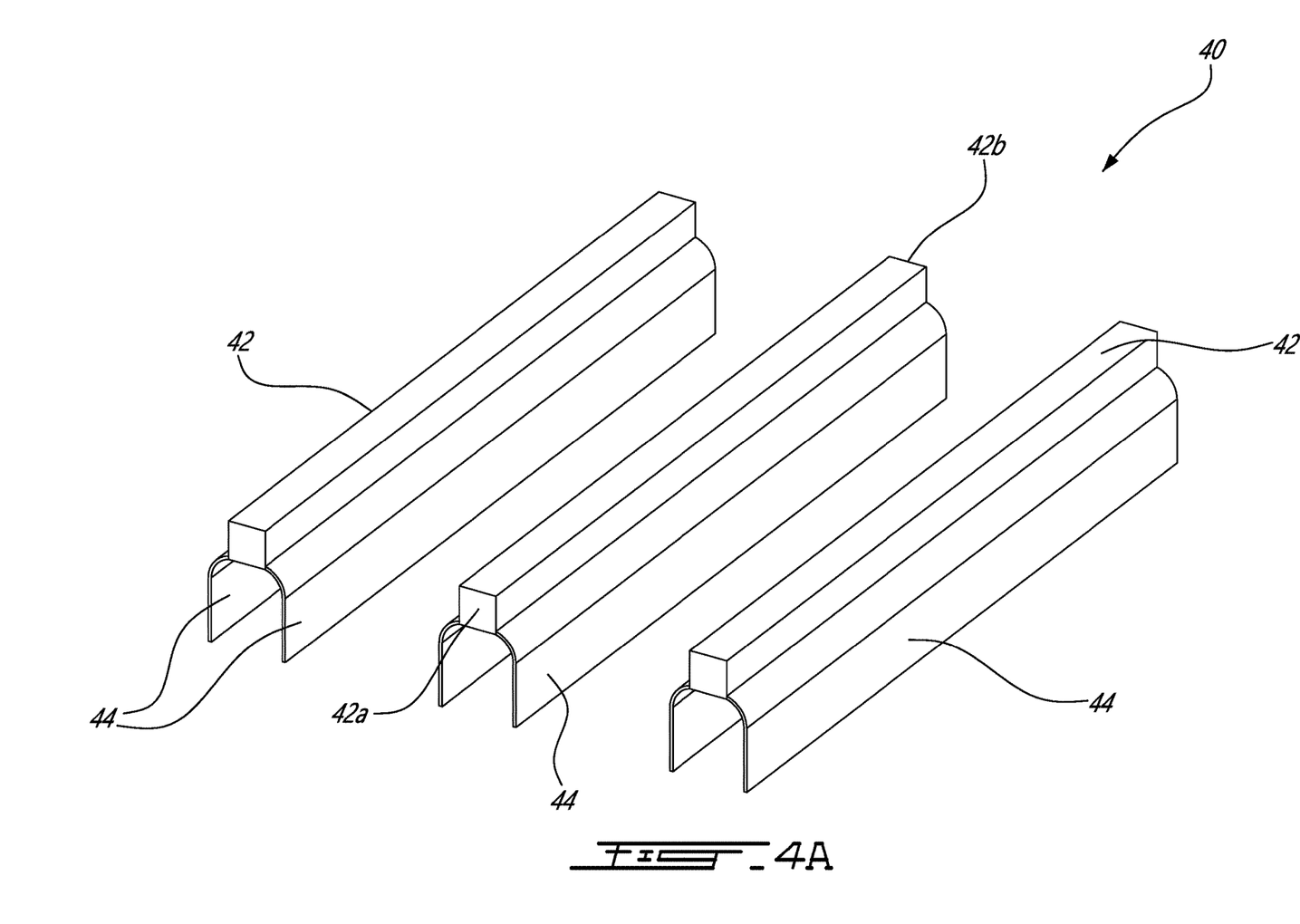
FIG. 4A is a perspective view of a cover for the heat exchanger duct of FIGS. 3A-3B in the first engine operational mode.
Figure 4B:
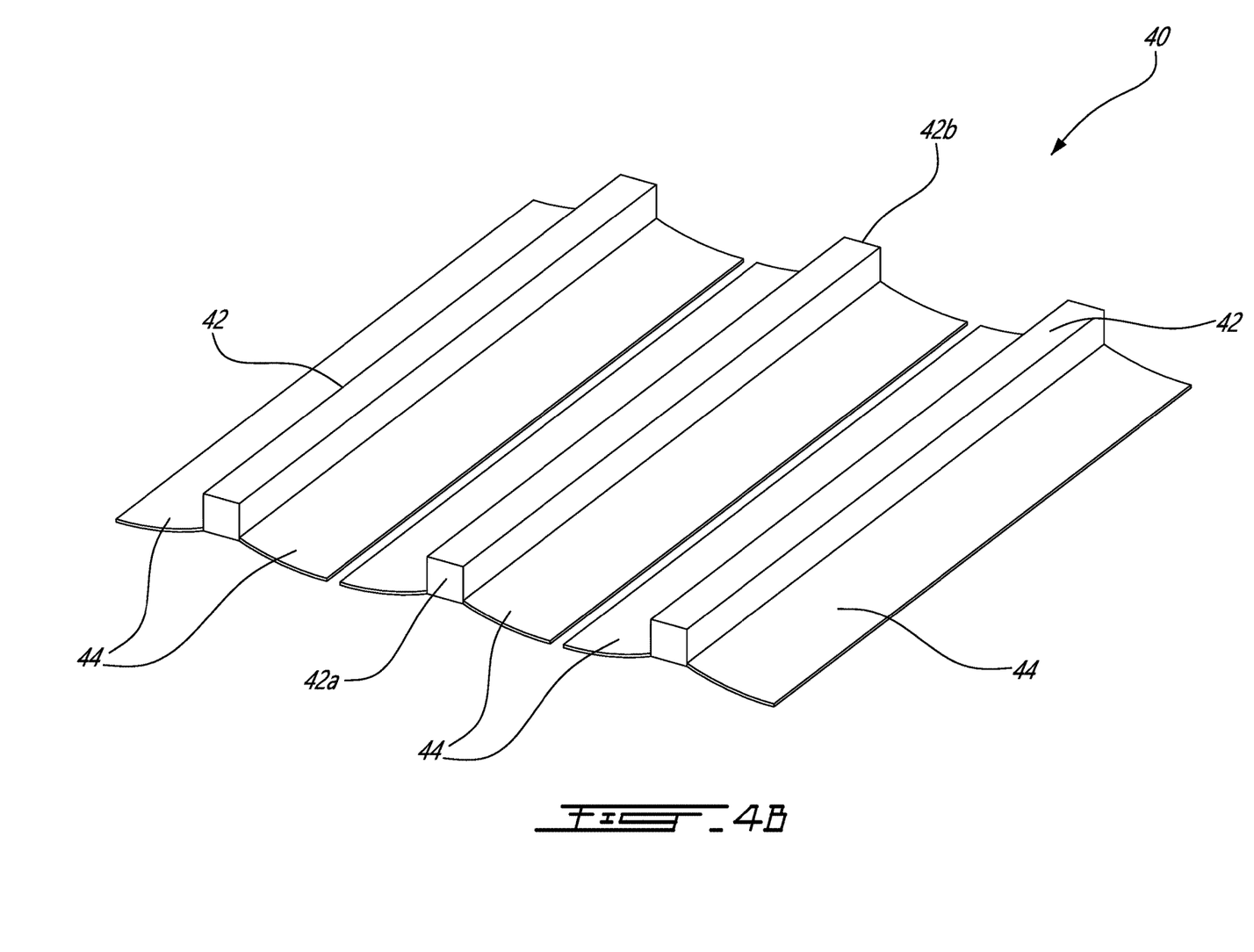
FIG. 4B is a perspective view of a cover for the heat exchanger duct of FIGS. 3A-3B in the second engine operational mode.

FIGS. 3A and 4A shows the exemplary cover 40 in its open position or configuration, i.e., where cooling airflow 36A is permitted to flow through the outlet duct 38 towards the exhaust duct 30, while FIGS. 3B and 4B shows the cover in its closed position or configuration, i.e., where exhaust flow 30a in the exhaust duct 30 is prevented from travelling upstream into the outlet duct 38 towards the air-cooled heat exchanger 34. The depicted cover 40 includes supports 42 extending across the outlet duct 38 from opposite walls 38a of the outlet duct 38 from a first end 42a to a second end 42b. In some embodiments, for instance where the heat exchanger duct has a square or rectangular cross-sectional shape, each support 42 may have a same length from first end 42a to second end 42b. In other cases, the lengths of the various supports 42 may vary, for instance if the heat exchanger duct has a circular cross-sectional shape. In some embodiments, the supports 42 may be I-beams.

In the shown embodiment, but not necessarily the case in all embodiments, each support 42 supports a bimetal plate 44 mounted thereto and operable for bending or folding (i.e., displacing) into various positions based on the temperature thereof. Each bimetal plate 44 is slotted into a corresponding slot in its support 42, as will be discussed in further detail below, and may be welded or otherwise secured thereto. Each bimetal plate 44 includes two separate metallic plates or strips, each of uniform composition, joined together along planar surfaces thereof, each metal plate having a different thermal coefficient of expansion than the other. Stated differently, the plates or strips are operable to expand or contract at different rates when heated or cooled. The plates or strips are fixed to one another along their lengths, for instance by riveting, brazing or welding. As such, as the strip with the higher coefficient of thermal expansion expands, it will curve around the strip with the lower coefficient of thermal expansion which expands less in comparison. The bimetal plate 44 is therefore configured for converting a change in temperature into a mechanical displacement, with one plate limiting the displacement of the other to create a predetermined displacement path. In the shown embodiment, the materials of the bimetal plates 44 are selected so that each bimetal plate 44 assumes a first shape or position (i.e., corresponding to the open position of the cover 40) below the predetermined temperature and a second shape or position (i.e., corresponding to the closed position of the cover 40) above the predetermined temperature. The supports 42 and the bimetal plates 44 supported thereby are arranged in parallel and at a distance from one another so that, in the open position, the bimetal plates 44 do not obstruct the flow through the outlet duct 38, and in the closed position, the bimetal plates 44 obstruct or prevent the flow through the outlet duct 38. Various obstruction arrangements may be contemplated, as will be discussed in further detail below. In some embodiments, the bimetal plates 44 are identically sized and shaped to one another. In other cases, for instance in the case of a heat exchanger duct having a circular cross-sectional shape, the bimetal plates 44 may vary in shape and/or size.

In the embodiment shown in FIGS. 3A-4B, the bimetal plates 44 extend in a substantially downstream direction from their supports 42 relative to the flow direction of cooling airflow 36a in the open position, and extend perpendicularly to the flow direction of the cooling airflow 36a in the closed position. While FIGS. 3A-4B depict a cover 40 having three supports 42 and three bimetal plates 44, other numbers of supports 42 and bimetal plates 44 may be contemplated. The shape and size of each bimetal plate 44, and the spacing between supports 42, may vary, for instance based on the number of supports 42 and bimetal plates 44. In the depicted embodiment, the outer metal plate of each bimetal plate 44 is more susceptible to temperature-based expansion and contraction than the inner plate of the bimetal plate 44, which may substantially resist changes in size despite fluctuating temperatures. As such, as each outer plate contracts (i.e., at temperatures below the predetermined temperature), it will fold or bend around the corresponding inner plate so that each bimetal plate 44 allows the cover to assume its open position. Conversely, as each outer plate expands (i.e., at temperatures above the predetermined temperature), the corresponding inner plate will not resist this expansion, allowing each bimetal plate 44 to assume the closed position. The opposite arrangement may also be contemplated, whereby each bimetal plate 44 is arranged so that expansion of one plate causes the bimetal plate 44 to assume the closed position. Various combinations of these arrangements may also be contemplated.

Figure 5:
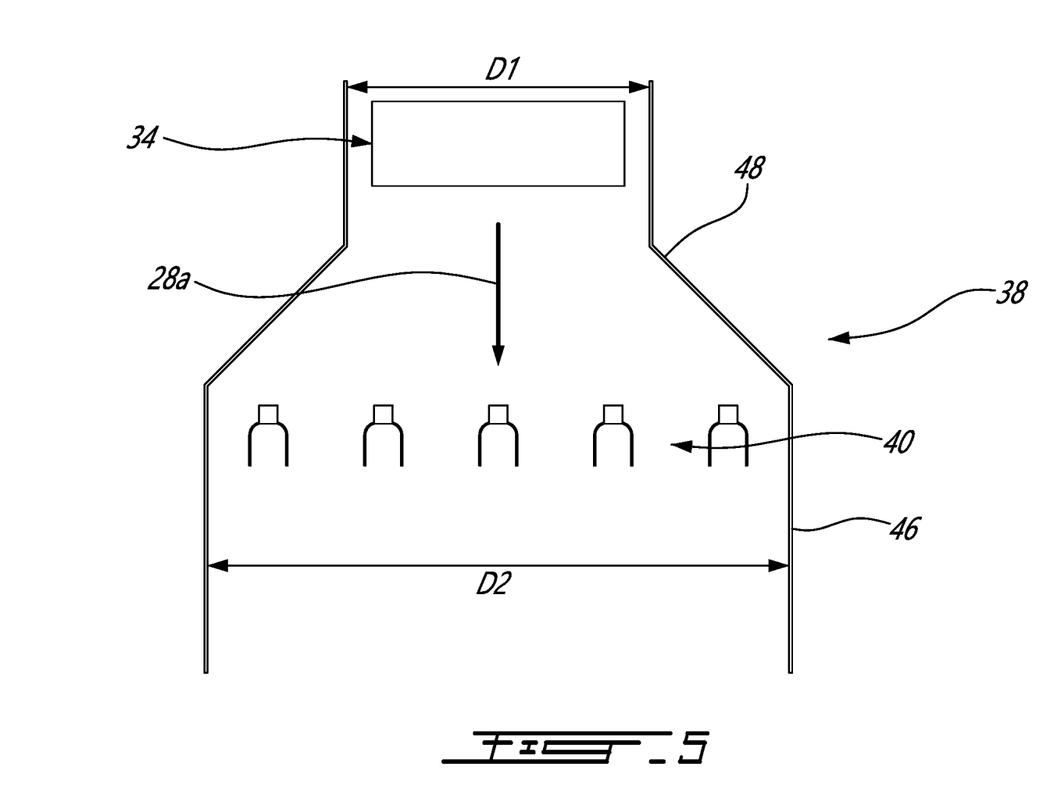
FIG. 5 is a schematic cross sectional view of a heat exchanger duct for the exhaust section of FIGS. 2A-2B according to another embodiment.

Referring to FIG. 5, another embodiment of the outlet duct 38 is shown. In this embodiment, a width of the outlet duct 38, for instance a diameter of the outlet duct 38 in the case of an outlet duct 38 having a circular cross-section, may vary along a length of the outlet duct 38 relative to the flow of the cooling airflow 36a. In the shown embodiment, the outlet duct 38 has a first width D1 at a downstream of the air-cooled heat exchanger 34, and a second width D2 at a wider portion 46 of the outlet duct 38 at the cover 40. A transition portion 48 of the outlet duct 38 where the width increases from D1 to D2 may be disposed between the upstream section of the outlet duct 38 and the wider portion 46. The provided increase in width at and downstream of the cover 40 may compensate for the cross-sectional area occupied by the cover 40 in its open position, which may block or hinder the flow of the cooling airflow 36a. Stated differently, in some embodiments, the width of the outlet duct 38 may be increased so that the overall mass flow of the cooling airflow 36a is not affected by the cross-sectional space occupied by the cover 40. Additionally or alternatively, one or more fins (not shown) may be provided upstream or downstream of the cover 40 in the outlet duct 38 to improve the flow pattern of the cooling airflow 36a and/or to reduce turbulent flows. In some cases, these fins may be operatively coupled to the supports 42, for instance to provide additional strength and reduce the likelihood of the supports 42 bending.

Figure 6:
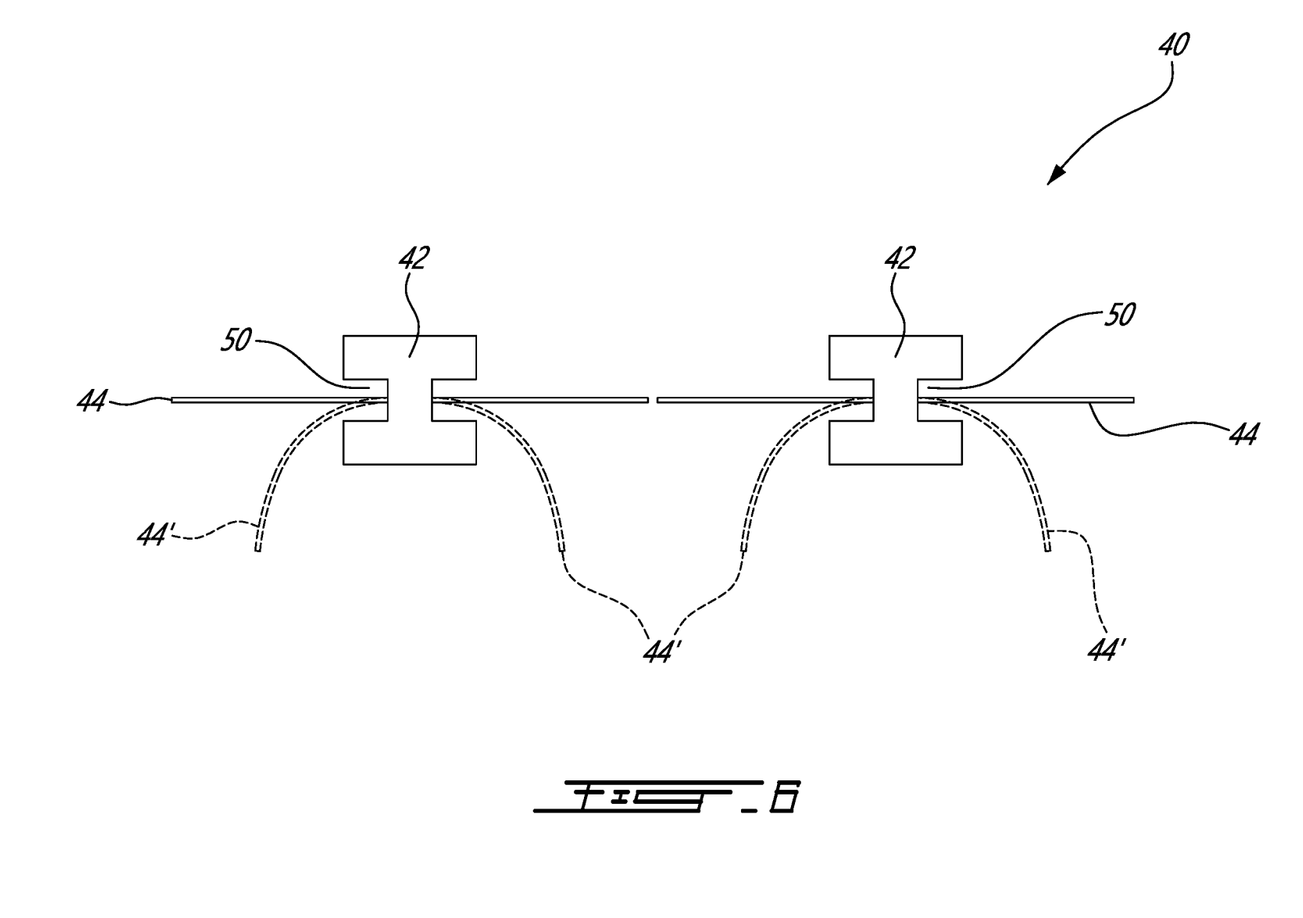
FIG. 6 is a schematic cross sectional view of cover for the heat exchanger duct of FIGS. 3A-3B according to an embodiment.
Figure 7:
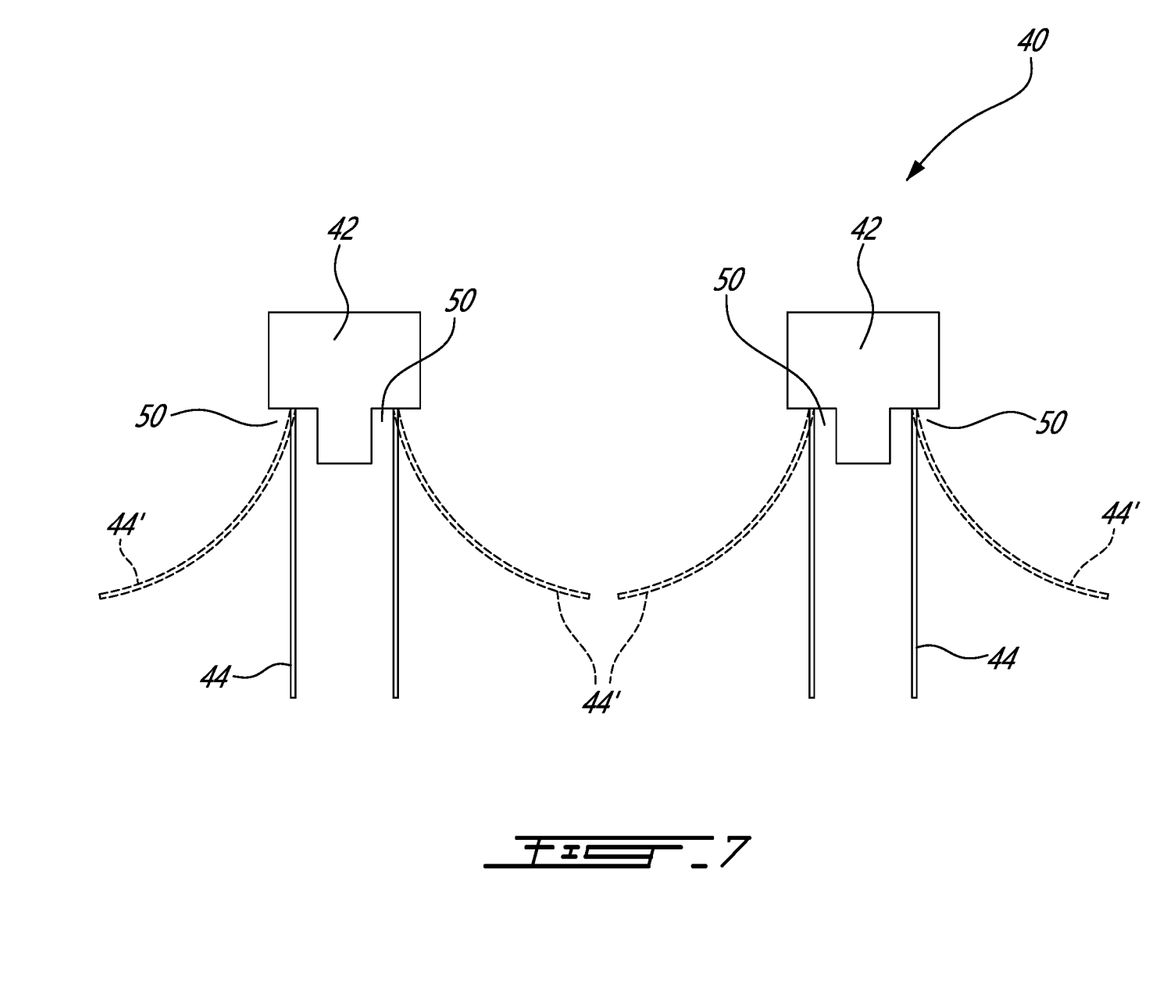
FIG. 7 is a schematic cross sectional view of cover for the heat exchanger duct of FIGS. 3A-3B according to another embodiment.
Figure 8:
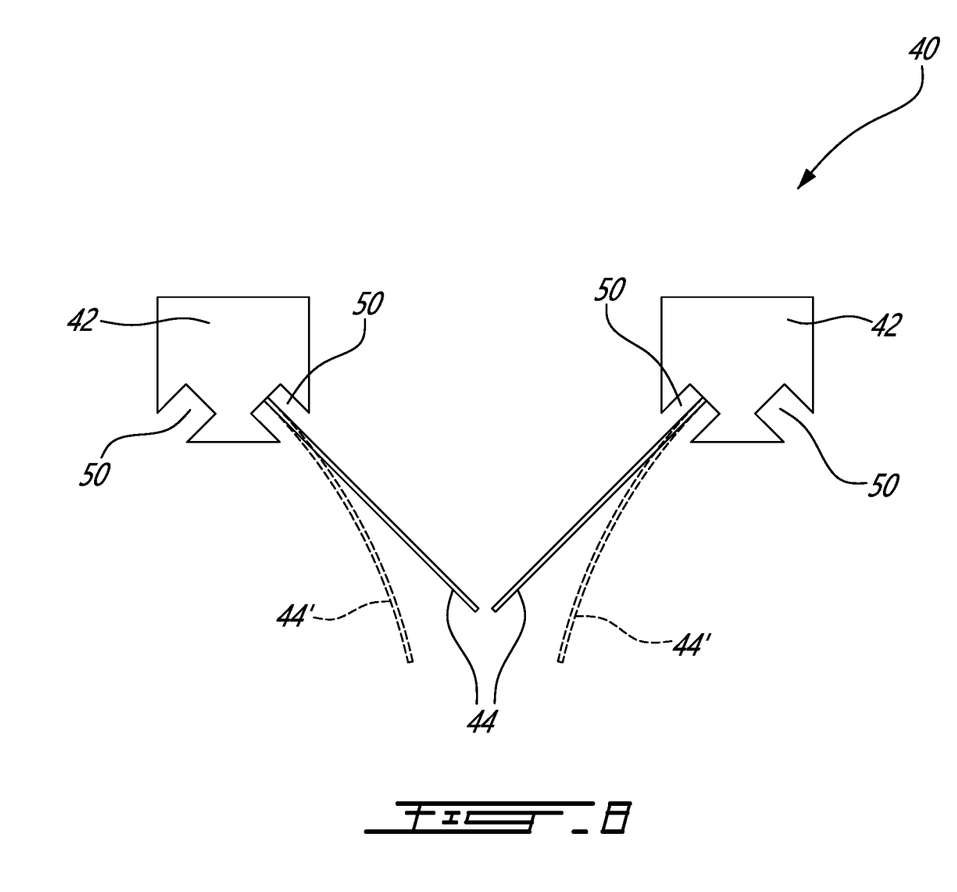
FIG. 8 is a schematic cross sectional view of cover for the heat exchanger duct of FIGS. 3A-3B according to another embodiment.

Referring now to FIGS. 6-8, various embodiments of a cover 40 are shown. For simplicity, only two supports 42 are illustratively shown for each cover 40, although it is understood that the number of supports 42 (and bimetal plates 44) for each cover 40 may vary. In the shown embodiments, the bimetal plates 44 are disposed in and extend from slots 50 in the supports 42, and are shown in closed and open configurations, with broken lines (44') illustrating the bimetal plates 44 in a bent configuration.

Referring to FIG. 6, each support 42 includes a pair of slots 50 disposed in lateral sides thereof, i.e., facing an adjacent support 42 in a direction perpendicular to the flow of the cooling airflow 36a in the outlet duct 38 (see FIGS. 2A and 3A). As such, in their straight position, the bimetal plates 44 extend outwardly from the slots 50 in a direction perpendicular to the flow of the cooling airflow 36a in the outlet duct 38, and collinearly, or aligned, with one another. This collinear configuration may correspond with the closed position of the cover 40, whereas the bent bimetal plates 44' may correspond with the open position of the cover 40. The two sheets of metals in each bimetal plate 44 are therefore selected and arranged so that they are bent (44') below the predetermined temperature and straighten out 44 above the predetermined temperature. In the shown case, a slight gap is formed between the straight bimetal plates 44 in the closed position of the cover 40. In such a case, the cover 40 may be said to be substantially closed (and the outlet duct 38 substantially sealed), as only a negligible volume of hot exhaust flow 30a is permitted to flow upstream into the outlet duct 38. In other cases, the straight bimetal plates 44 may meet or overlap to better seal the outlet duct 38 in the closed position of the cover 40. Stated differently, distal ends of adjacent pairs of bimetal plates 44 may overlap for a better seal.

Referring to FIG. 7, each support 42 includes a pair of slots 50 disposed on downstream sides thereof relative to the flow of the cooling airflow 36a in the outlet duct 38 (see FIGS. 2A and 3A). As such, in their relaxed or straight position, the bimetal plates 44 extend outwardly from the slots 50 in a downstream direction relative to the flow of the cooling airflow 36a in the outlet duct 38, and in parallel with one another. This downstream-oriented, parallel configuration may correspond with the open position of the cover 40, whereas the bent bimetal plates 44' may correspond with the closed position of the cover 40. The two sheets of metals in each bimetal plate 44 are therefore selected and arranged so that they are straight (at 44) below the predetermined temperature and fold or bend (at 44') above the predetermined temperature. In the shown case, a slight gap is formed between the straight bimetal plates 44 in the closed position of the cover 40. In such a case, the bent bimetal plates 44' may meet at their distal ends in the closed position of the cover 40. In other cases, a gap may form therebetween, or the bent bimetal plates 44' may overlap for various degrees of sealing.

Referring to FIG. 8, each support 42 includes a pair of slots 50 disposed in a downstream corner thereof relative to the flow of the cooling airflow 36a in the outlet duct 38 (see FIGS. 2A and 3A). As such, in their relaxed or straight position, the bimetal plates 44 extend outwardly from the slots 50 in a direction that is angled relative to the flow of the cooling airflow 36a in the outlet duct 38, for instance at approximately 45 degrees relative to the flow of the cooling airflow 36a in the outlet duct 38, with adjacent bimetal plates 44 meeting at distal ends thereof in their relaxed or straight position. This angled configuration may correspond with the closed position of the cover 40, whereas the bent bimetal plates 44' may correspond with the open position of the cover 40. The two sheets of metals in each bimetal plate 44 are therefore selected and arranged so that they are bent (44') below the predetermined temperature and straighten out (44) above the predetermined temperature to assume the angled configuration. In the shown case, a slight gap is formed between the straight bimetal plates 44 in the closed position of the cover 40. In such a case, the cover 40 may be said to be substantially closed, as only a negligible volume of hot exhaust flow 30a is permitted to flow upstream into the outlet duct 38. In other cases, the straight bimetal plates 44 may meet or overlap to better seal the outlet duct 38 in the closed position of the cover 40.

Various materials may be selected for the cover 40. The supports 42 may be made from a material that allows the supports 42 to remain static as the bimetal plates 44 displace and as the cooling airflow 36a passes thereby. For instance, the supports 42 may be made from stainless steel. Other materials may be contemplated. The supports 42 and bimetal plates 44 may be made from materials that can withstand the high exhaust flow 30a temperatures flowing through the exhaust duct 30 (for instance, 1000 degrees Fahrenheit). As discussed above, the bimetal plates 44 may be formed of two distinct metals having different thermal coefficients of expansion to provide the required temperature-dependent bending effect. For instance, the bimetal plates 44 may be made from steel and copper, or from steel and brass. Other material combinations may be contemplated. In accordance with the present disclosure, an exemplary method is shown for operating an aircraft engine 10. In a first operating mode in which the aircraft engine 10 is operating, air is allowed to flow through an air-cooled heat exchanger 34 towards an exhaust duct 30 of the aircraft engine 10 via a cover 40 disposed between the air-cooled heat exchanger 34 and the exhaust duct 30 being in an open position. In a second operating mode in which the aircraft engine 10 is shut down, exhaust gas is prevented from flowing from the exhaust duct 30 towards the air-cooled heat exchanger 34 via the cover 40 being in a closed position. The cover 40 is movable between the open position and the closed position at a predetermined temperature of the cover 40 indicative of a alteration between the first operating mode and the second operating mode.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the shape of the supports 42 and bimetal plates 44 may vary, for instance based on strength and aerodynamic requirements. Yet further modifications could be implemented by a person of ordinary skill in the art in view of the present disclosure, which modifications would be within the scope of the present technology.

The invention claimed is:

1. An aircraft engine, comprising:
   a core gas path through which a core gas flow flows;
   an exhaust duct receiving the core gas flow;
   an air-cooled heat exchanger disposed in a heat exchanger duct having an air inlet providing cooling air to the air-cooled heat exchanger and an air outlet in fluid communication with the exhaust duct; and a cover disposed in the heat exchanger duct downstream of the air-cooled heat exchanger, the cover movable between an open position, in which the cover allows the cooling air to flow through the air outlet into the exhaust duct, and a closed position, in which the cover substantially blocks the air outlet, wherein the cover is operable to move from the open position to the closed position at a predetermined temperature of the cover.

2. The aircraft engine as defined in claim 1, wherein the cover includes supports extending across the air outlet and supporting bimetal plates, the bimetal plates operable to displace from a first configuration corresponding to the open position of the cover to a second configuration corresponding to the closed position of the cover at the predetermined temperature of the cover.

3. The aircraft engine as defined in claim 2, wherein, in the first configuration corresponding to the open position of the cover, the bimetal plates extend in a direction aligned with a flow of the cooling air through the heat exchanger duct.

4. The aircraft engine as defined in claim 2, wherein, in the second configuration corresponding to the closed position of the cover, distal ends of adjacent pairs of the bimetal plates overlap with one another.

5. The aircraft engine as defined in claim 2, wherein, in the second configuration corresponding to the closed position of the cover, the bimetal plates extend in a direction perpendicular to a flow of the cooling air through the heat exchanger duct.

6. The aircraft engine as defined in claim 2, wherein each of the bimetal plates includes a first metallic strip fixed to a second metallic strip along planar surfaces thereof, the first metallic strip having a first coefficient of thermal expansion and the second metallic strip having a second coefficient of thermal expansion different than the first coefficient of thermal expansion.

7. The aircraft engine as defined in claim 1, wherein the air outlet is disposed above the exhaust duct relative to a central longitudinal axis of the aircraft engine.

8. The aircraft engine as defined in claim 1, wherein the heat exchanger duct includes an outlet duct having a width that increases between a first location adjacent the air-cooled heat exchanger and a second location adjacent the cover.

9. The aircraft engine as defined in claim 1, wherein the predetermined temperature of the cover is selected to be at most below a lowest melting point of materials forming the air-cooled heat exchanger.

10. A cover for selectively allowing a flow of gas through a heat exchanger duct upstream of an exhaust duct in an aircraft engine relative to a direction of the flow of gas through the heat exchanger duct, the heat exchanger duct including an air-cooled heat exchanger disposed therein comprising:
a plurality of supports extending across the heat exchanger duct downstream of the air-cooled heat exchanger relative to the direction of the flow of gas through the heat exchanger duct; and
a plurality of bimetal plates mounted to the supports, the bimetal plates displaceable between a first configuration, below a predetermined temperature of the cover, in which the bimetal plates allow the flow of gas through the heat exchanger duct and a second configuration, above the predetermined temperature of the cover, in which the bimetal plates hinder the flow of gas through the heat exchanger duct.

11. The cover as defined in claim 10, wherein, in the first configuration, the bimetal plates extend in a direction aligned with the flow of gas through the heat exchanger duct.

12. The cover as defined in claim 10, wherein, in the second configuration, distal ends of adjacent pairs of the bimetal plates overlap with one another.

13. The cover as defined in claim 10, wherein, in the second configuration, the bimetal plates extend in a direction perpendicular the flow of gas through the heat exchanger duct.

14. The cover as defined in claim 10, wherein each of the bimetal plates includes a first metallic strip fixed to a second metallic strip along planar surfaces thereof, the first metallic strip having a first coefficient of thermal expansion and the second metallic strip having a second coefficient of thermal expansion different than the first coefficient of thermal expansion.

15. The cover as defined in claim 10, wherein the predetermined temperature of the cover is selected to be at most below a lowest melting point of materials forming the air-cooled heat exchanger.

16. A method of operating an aircraft engine, comprising:
in a first operating mode in which the aircraft engine is operating, allowing air to flow through an air-cooled heat exchanger towards an exhaust duct of the aircraft engine via a cover disposed between the air-cooled heat exchanger and the exhaust duct being in an open position; and
in a second operating mode in which the aircraft engine is shut down, preventing exhaust gas from flowing from the exhaust duct towards the air-cooled heat exchanger via the cover being in a closed position;
wherein the cover is movable between the open position and the closed position at a predetermined temperature of the cover indicative of an alteration between the first operating mode and the second operating mode.

17. The method as defined in claim 16, wherein allowing the air to flow through the air-cooled heat exchanger towards the exhaust duct further includes bimetal plates of the cover extending in a direction parallel to a direction of a flow of the air.

18. The method as defined in claim 16, wherein preventing the exhaust gas from flowing from the exhaust duct towards the air-cooled heat exchanger further includes bimetal plates of the cover extending in a direction perpendicular to a direction of a flow of the air.

19. The method as defined in claim 16, wherein preventing the exhaust gas from flowing from the exhaust duct towards the air-cooled heat exchanger further includes bimetal plates of the cover having distal ends overlapping with one another.

20. The method as defined in claim 16, wherein preventing the exhaust gas from flowing from the exhaust duct towards the air-cooled heat exchanger further includes preventing the exhaust gas from flowing towards the air-cooled heat exchanger in an upward direction relative a central longitudinal axis of the aircraft engine.

* * * * *